(12) United States Patent
Shwartz et al.

(10) Patent No.: US 10,757,402 B2
(45) Date of Patent: Aug. 25, 2020

(54) CAMERA CERTIFICATION FOR VIDEO SURVEILLANCE SYSTEMS

(71) Applicant: Verint Systems, Ltd., Herzliya, Pituach (IL)

(72) Inventors: Omer Shwartz, Ramat Hasharon (IL); Ran Gur, Yehud (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 16/215,972

(22) Filed: Dec. 11, 2018

(65) Prior Publication Data
US 2019/0182477 A1    Jun. 13, 2019

Related U.S. Application Data

(60) Provisional application No. 62/597,014, filed on Dec. 11, 2017.

(51) Int. Cl.
*H04N 17/00*  (2006.01)
*H04N 5/232*  (2006.01)
*G06T 7/80*  (2017.01)
*H04N 7/18*  (2006.01)

(52) U.S. Cl.
CPC ............. *H04N 17/002* (2013.01); *G06T 7/80* (2017.01); *H04N 5/232939* (2018.08); *H04N 7/181* (2013.01)

(58) Field of Classification Search
CPC ............................ H04N 21/25875; G06T 7/80
See application file for complete search history.

(56) References Cited

U.S. PATENT DOCUMENTS

| | | | | |
|---|---|---|---|---|
| 2002/0056043 | A1* | 5/2002 | Glass ...................... | G06F 21/32 713/179 |
| 2004/0136388 | A1* | 7/2004 | Schaff .............. | G08B 13/19656 370/401 |
| 2012/0017081 | A1* | 1/2012 | Courtney ........... | G06K 7/10722 713/156 |
| 2012/0021835 | A1* | 1/2012 | Keller ..................... | H04L 67/38 463/42 |
| 2014/0007048 | A1* | 1/2014 | Qureshi .................. | H04L 63/20 717/110 |
| 2014/0375819 | A1* | 12/2014 | Larsen ................. | G08B 13/196 348/159 |
| 2017/0099455 | A1* | 4/2017 | Mazzarella ............. | H04W 4/90 |
| 2018/0198688 | A1* | 7/2018 | Dawes .................... | H04L 41/22 |
| 2019/0089696 | A1* | 3/2019 | Kim .................... | H04L 63/0823 |

\* cited by examiner

*Primary Examiner* — Paulos M Natnael
(74) *Attorney, Agent, or Firm* — Meunier Carlin & Curfman LLC

(57) ABSTRACT

Cameras for use in a video surveillance system that is controlled by a video management system (VMS) may have a variety of operating characteristics and capabilities. For a VMS to communicate effectively with each camera, a file must be created for use by the VMS to that specifies how to connect with and operate the camera according to the camera's available and functioning capabilities. The verification of the camera's available/functioning capabilities and the creation of the file is a resource-consuming process known as certification. Disclosed herein are systems and methods that automate the certification process to make certifying cameras more efficient and cost effective.

16 Claims, 7 Drawing Sheets

CAMERA CERTIFICATION FOR VIDEO SURVEILLANCE SYSTEMS

FIELD OF THE INVENTION

The present disclosure relates to cameras for video surveillance systems and more specifically, to a method for certifying cameras for use with a video management system of a video surveillance system.

BACKGROUND

Safety and security is made easier through the use of video surveillance systems. These video surveillance systems utilize a plurality of cameras installed throughout a facility/location to capture video of activity occurring in various areas. The video is typically stored in a searchable database but may also be viewed in real-time by a user. The user interfaces with the surveillance system through a video management system (VMS) running on a computing device. The VMS provides the user with a graphical user interface (GUI) through which the user may control the various aspect of the system. For example, the user may interact with the VMS to control the operation of the cameras, view video, analyze video, and the like.

A video surveillance system may utilize cameras of a variety of types and from a variety of vendors. Each year hundreds of new camera models are introduced by dozens of different camera vendors. As a result, cameras in a video surveillance system may have different control parameters, may communicate differently, and may provide different information. Accordingly, the VMS must be configured to interact with each camera according to each camera's particular requirements.

Camera vendors typically supply an application programming interface (API) to provide a means for the VMS to interface with the camera at a level invisible to a user. Typically, the API for a particular camera is developed, owned, and controlled the particular camera's vendor. In some cases, a vendor may provide one API common to all of its camera models, but often a vendor may provide different APIs for each of its camera models because each may have different operating characteristics.

Recently, steps have been taken to standardize the APIs for cameras. For example, industry forums, such as the open network video interface forum (ONVIF), have been created with the goal of standardizing the interface of security products, including the APIs for security cameras. The adoption of these standards is not universal because a standard API may not reflect all features of a camera. Accordingly, new camera models typically support both an ONVIF API, which provides a basic interface, and a proprietary API, which provides a complete interface. To make matters worse, the implementation of the ONVIF standard may not be consistently applied by all vendors.

To address the problem of interfacing with various cameras that require a proprietary API or a "standard" API with a particular implementation, a certification process for each camera is necessary before using the camera with the VMS. The certification process for each camera may require a user to (i) discover the camera's supported functionality, (ii) create a file for use by the VMS, which specifies how to connect with the camera and the functionality supported by the camera, and (iii) test the operation of the camera with the VMS by performing dozens of tests, which validate the camera's functionality and which check the accuracy of the file created for use by the VMS. The certification process may be time consuming (e.g., may span a period of days) when performed manually.

Traditionally, the provider of the VMS performs the certification process because the file created during the certification process requires specialized knowledge. As a result, certifying all possible cameras for use with a VMS requires considerable time (e.g., obtaining/returning cameras) and resources (e.g., stewardship of cameras). In addition, when the certification process is performed manually there are additional development and quality assurance resources required because of human error, especially for testers without specialized experience or knowledge.

The video industry is growing and the volume of new and existing cameras that must be certified for use with a VMS in a video surveillance system will scale with this growth. There exists a need, therefore, for a more efficient certification process.

SUMMARY

Accordingly, a system and method for automatically certifying cameras for operation with a VMS are disclosed. The system and method improve the certification process for a camera by automatically validating operations of a camera and generating the file for use by the VMS to operate the camera according to validated operations of the camera.

The system and method do not require installation of a VMS or video surveillance system. For example, the certification process may be performed by a camera vendor at the location of the camera vendor immediately after a new model is introduced. Accordingly, the need to ship the camera to the VMS provider or to a location of a video surveillance system for testing is eliminated.

The system and method reduces the time necessary for certification as compared to traditional methods. For example, the certification process can take 10-30 minutes.

The system and method allow for the certification process to be performed by a user of any skill level. For example, a user does not require any prior technical development knowledge.

In one aspect, the present disclosure embraces a method for certifying cameras for use by a video management system (VMS) of a video surveillance system. In the method, a camera (e.g., IP camera) for certification is provided and one or more capabilities of the camera are obtained. The one or more capabilities are then validated and results are received. The received results include a pass or a fail for each of the one or more capabilities. From these received results one or more capabilities that received a pass are selected for use with the VMS. Based on the selection, a file is created for the VMS. The file is used by the VMS to operate the camera according to the selected capabilities. Based on the created file, the camera is certified for use by the VMS to operate the camera according to the validated capabilities (i.e., the capabilities indicated in the file).

In exemplary embodiment of the method, the method may include providing a computer that is communicatively coupled to the camera via a network. The computer may be used to perform the steps in the method necessary for certifying the camera. This is typically accomplished through a graphical user interface (GUI) shown on a display of the computer and with which a user may interact with during the certification process. For example, the GUI may show one or more capabilities detected in the camera. A user may select one or more of these displayed capabilities for testing. After selection the testing can be carried out automatically by performing one or more tests for each one of the selected capabilities in sequence. A test may include transmitting a message from the computer to the camera, wherein the message causes the camera to perform an operation (e.g., device capability reporting, video streaming, audio streaming, motion detection, output relay operation, dry contact input checking, pan-tilt-zoom moving, camera tampering detection, and edge storage) corresponding to a capability of the camera. During or after operation, the computer may receive information corresponding, or resulting from, the operation. This received information is then compared to an expected test result (e.g., stored on the computer) to determine if the test of the capability has passed or failed. These results may be displayed on in the GUI and a user may select which of the passed capabilities that should be included in the file created for the camera. The file may be an extensible markup language (XML) file that may be used by the VMS to communicate with the camera in a video surveillance system.

The method may be embodied/implemented variously. For example, a system for certifying cameras may include a camera and a computer. Software running on the computer may operate the computer's processor to perform the method described above. In another example, a non-transitory tangible computer readable medium may containing computer readable instructions that when executed by a processor of a computer cause the computer to execute the method described above.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

Figure (FIG. 1 is a flow chart of a method for certifying cameras for use by a video management system (VMS) of a video surveillance system according to an exemplary embodiment of the present disclosure.

FIGS. 3A-3E graphically depict screen shots from an exemplary GUI in an implementation of the method of FIG. 1, wherein FIG. 3A illustrates entering connection information for a camera, FIG. 3B illustrates receiving capabilities from the camera, FIG. 3C illustrates testing of the camera's capability, FIG. 3D illustrates displaying test results, and FIG. 3E illustrates a completed camera verification.

DETAILED DESCRIPTION

The present disclosure embraces a system and method for certifying cameras for use by a video management system of a video surveillance system. The system and method automate portions of the certification process that have traditionally required significant resources and allow for certification to be performed by users without specialized knowledge. Further, the certification may be performed at any location and without the need for an operating VMS or surveillance system at the location of the certification.

Figure 1:
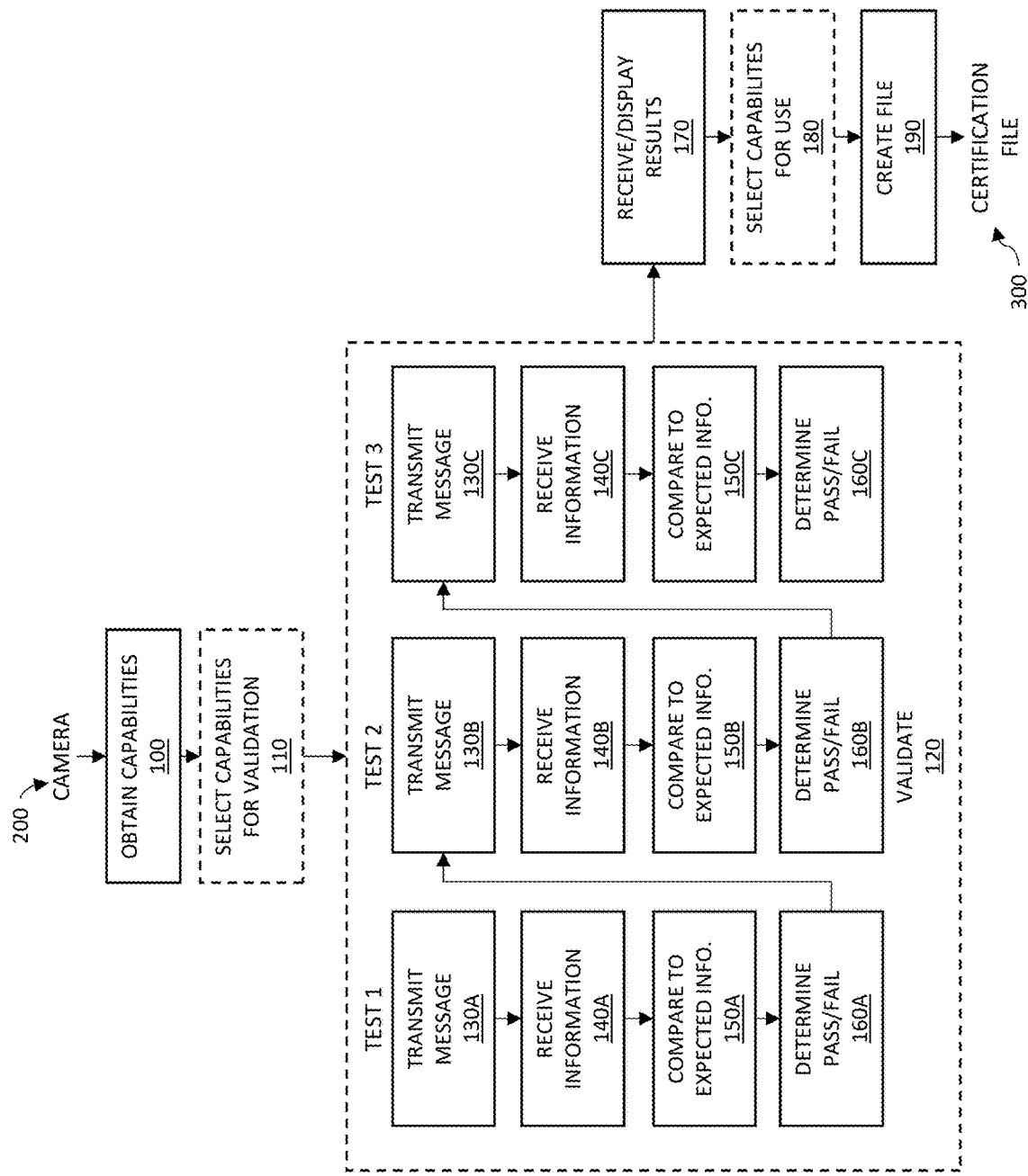

A flow chart of an exemplary method for certifying cameras (i.e., certification process) is shown in FIG. 1. In the method, a camera 200 is provided and communicatively coupled, either directly or via a computer network, to a computer (e.g., desktop computer, laptop computer, mobile device, etc.) running a software tool (i.e., certification application) to carry out operations in the certification process. The certification application provides a user with a graphical user interface (i.e., GUI) to interact with the certification process when necessary. For example, the certification application may require a user to provide credentials (e.g., login) and provide a camera's network identification (e.g., IP address) for communication with the camera. It is contemplated that the certification application may, in some embodiments, automatically search for active cameras on a network and provide the user a list of active cameras for certification.

After communication between the certification application and the camera 200 is established, one or more capabilities of the camera can be obtained 100 automatically. For example, the certification application may automatically obtain the capabilities of the camera using the camera's API. Obtaining the capabilities of the camera automatically greatly reduces the time for certification. When performed manually, this operation may take hours because a user may be required to read/understand the camera's specification documents to obtain the camera's capabilities. When performed automatically, however, this operation may take seconds.

A user is presented with a list of the camera's capabilities via the GUI of the certification application. For example, the list may include the detected capabilities (i.e., supported by the camera). In another example, the list may include both the detected capabilities and capabilities that were expected but not detected. By providing a list that includes both detected and undetected capabilities, a user may determine a problem that requires attention and may contact the certification application provider to diagnose and solve the problem.

A user may then interact with the GUI to select 110 capabilities for validation. Typically, all capabilities are automatically selected, and a user has the option to deselect some capabilities that he/she does not wish to be validated for certification. For example, if a particular capability is not important to a user he/she may deselect the capability to remove the capability from the remaining operations in the certification process and thereby expedite the certification process.

Next, the selected capabilities are validated 120 by testing. In other words, selecting capabilities prescribes a series of tests for validation. During validation, each of these tests is performed automatically (e.g., in sequence). In the example shown in FIG. 1, three capabilities are tested (i.e., "TEST 1", "TEST 2", and "TEST 3") to validate the operation of each of the capabilities. In some cases, a single capability may require multiple different tests during validation.

Each test may generally comprise several steps. For example, a test may include transmitting 130A, 130B, 130C a message from the computer to the camera causing the camera to perform an operation or return queried data according to a capability. In response, the computer may receive 140A, 140B, 140C information from the camera corresponding to the operation or the query. The received information can then be compared 150A, 150B, 150C to expected information stored on the computing device to determine 160A, 160B, 160C if the test has passed or failed. In some cases, human interaction with the camera may be required for a test.

Validation 120 may include one or more tests for device capability reporting. For example, to test device capabilities, the certification application attempts to obtain device capabilities by sending a request to the camera. If a response with at least one capability is received, the test passes, otherwise it fails.

Validation 120 may include one or more tests for video streaming. For example, to test video streaming, the certification application attempts to receive a video stream at various combinations of capture mode, resolution, and maximum frame rate. For example, for each capture mode and resolution the certification application tries to receive a video steam at a maximum frame rate. If a video stream is not received for one capture mode and resolution combination, the test is repeated with a lower maximum frame rate. If a video stream is still not received, then the test fails for this capture mode and resolution. If a video stream is received, however, then the test passes for this capture mode and resolution.

Validation 120 may include one or more tests for audio streaming. For example, to test audio streaming, the certification application attempts to configure the camera to begin an audio stream. If audio is not received in real time protocol (RTP) packets then the test fails. If audio is received in RTP packets then the test passes.

Validation 120 may include one or more tests for motion detection. For example, to test motion detection, it may be first determined that the camera has configurable motion detection parameters (e.g., sensitivity and region of interest). If so, the sensitivity is set to maximum and the camera is monitored for a motion detection alarm. If an alarm for motion is received, then the tests passes. If no alarm for motion is received for a period, then the test fails.

Validation 120 may include one or more tests for output relay. For example, to test output relay, the certification application transmits a command to the camera to change the physical state of one of the camera's input/output (I/O) ports from opened to closed. Next, the camera is queried to determine the state of the changed I/O port. If the response to the query indicates that the I/O port is closed then the test passes, otherwise it fails.

Validation 120 may include one or more tests for dry contact input. For example, a dry contact input test requires human interaction and in this test, a user actively closes the circuit in one of the camera's I/O ports. If the certification application receives an event from the camera indicating that the circuit has been closed then the test passes, otherwise it fails.

Validation 120 may include one or more tests for pan-tilt-zoom (PTZ). For example, the certification application sends a pan, tilt, and zoom command to the camera and verifies that the camera has moved. If the camera moves for all commands, then the PTZ test passes and the camera is validated as a PTZ camera. If the camera only moves for a zoom command, then the camera passes the zoom test but fails pan and tilt test. Based on this result, the camera is validated as a zoom camera but not as a PTZ camera. If all tests fail then the PTZ tests fail.

Validation 120 may include one or more tests for camera tampering. For example, a camera tampering test requires a human to create a tampering event (e.g., covering the camera's lens). The certification application may prompt a user to create the tampering event. If the certification application receives a response from the camera indicating a tampering event within a period after the prompt, then the tests passes, otherwise it fails.

Validation 120 may include one or more tests for edge storage. For example, the certification application detect edge storage (e.g., an SD card) from a query of the status (e.g., attached, detached, full, etc.) of the edge storage. If edge storage is detected then the certification application sends a command to the camera to start recording to the edge storage. After a period, a stop recording command is sent. Next, a query is sent to the camera for a list of files stored. The most recently stored filed may be downloaded and verified to be non-zero in size.

After each or all of the tests in the validation are complete, the results for each are received/displayed 170 on the GUI of the certification application. In some embodiments, a user may be allowed to select 180, from this list, capabilities for certification. Typically, all capabilities that have passed validation will be automatically selected. A user, however, may deselect any of these capabilities for certification. For example, if a camera provider has a capability that is still being testing then certification for wider use may not be desirable.

In the last step of the certification process, a file (i.e., certification file 300) is created 190 for use by a VMS to operate the camera according to the selected capabilities. The file may be embodied as a file package (i.e., results package) that includes several files. For example, a file package may include an XML file, a test report file, and log files. A test report file (i.e., summary report) created during the certification process may include details corresponding to the tests (e.g., test results), selections made for inclusion/exclusion, and execution logs. The file package may be sent to camera users (e.g., VMS provider) for use in operating the camera. In some embodiments, the file package may be compressed into a compressed file (e.g., zip file) for easy communication.

A strength of the certification process is that it simplifies the process of adding a camera to a VMS system. Adding a camera to a VMS system simply requires the addition of the file (e.g., XML file) without the need for a more complex operation, such as recompiling the VMS system.

The discrete nature of the file package eases the complexity of making changes to the certification process. Tests may be added or removed and information gathered for inclusion in the test report may be added or removed without affecting the general certification process approach. For example, it is envisioned that network packet information may be added to the results package to ease troubleshooting. In addition, it is envisioned that a digital signature may be added to the results package (and/or to files therein) for usage control.

Figure 2:
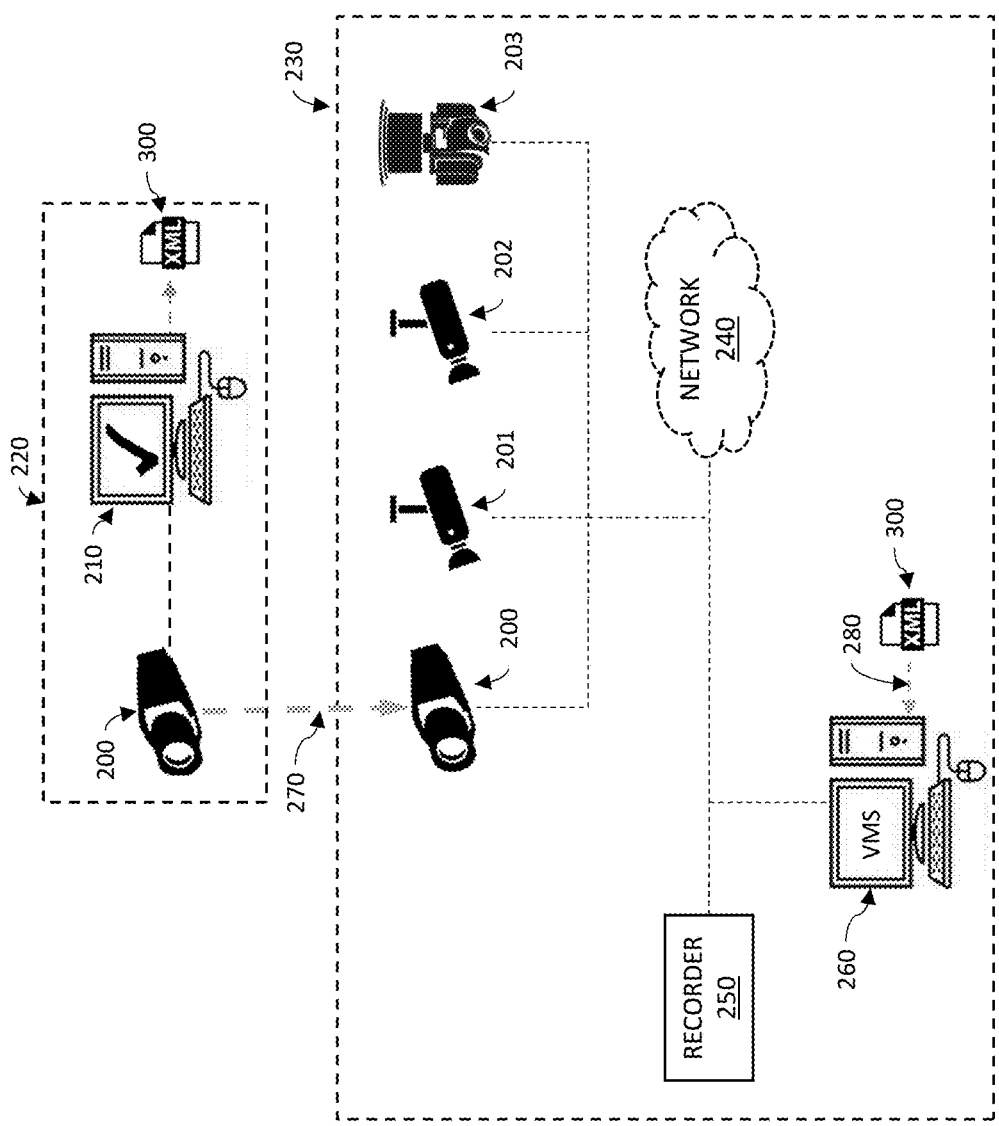
FIG. 2 schematically depicts a system for certifying cameras for use by a video management system (VMS) of a video surveillance system according to an exemplary embodiment of the present disclosure.

FIG. 2 schematically depicts a video surveillance system 230. The video surveillance system includes a plurality of cameras 200, 201, 202, 203. The cameras may each function/communicate differently. For example, the system may include a PTZ camera 203 and a fixed mount camera 200. The cameras may be from different camera providers or may be different models 201, 202 from the same provider. The surveillance system 230 includes at least one recorder 250 and at least one workstation 260. The cameras 200, 201, 202, 230, the recorder 250, and the workstation 260 are typically communicatively connected via a network 240. A user may use interact with the cameras and the recorder using a VMS running on the workstation.

Cameras may be certified for use by a VMS of a video surveillance system by a system for certifying cameras 220 (i.e., certification system). The certification system 220 includes a camera for certification 200, and a computer 210. As discussed, the results of the certification include a file 300 that can be read by the VMS to operate the camera.

Thus, adding or replacing 270 a camera 200 in the surveillance system may require importing 280 the file 300 onto the workstation 260 for use with the VMS. Because the certification can take place anywhere and at any time. It is typical, however, for camera providers to submit (e.g., via FTP) the file 300 for a camera to the VMS provider before the camera is released for sale. Accordingly, the VMS may include files for many different cameras, thereby easing the requirements for replacing or adding a camera to the video surveillance system 230.

Figure 3A:
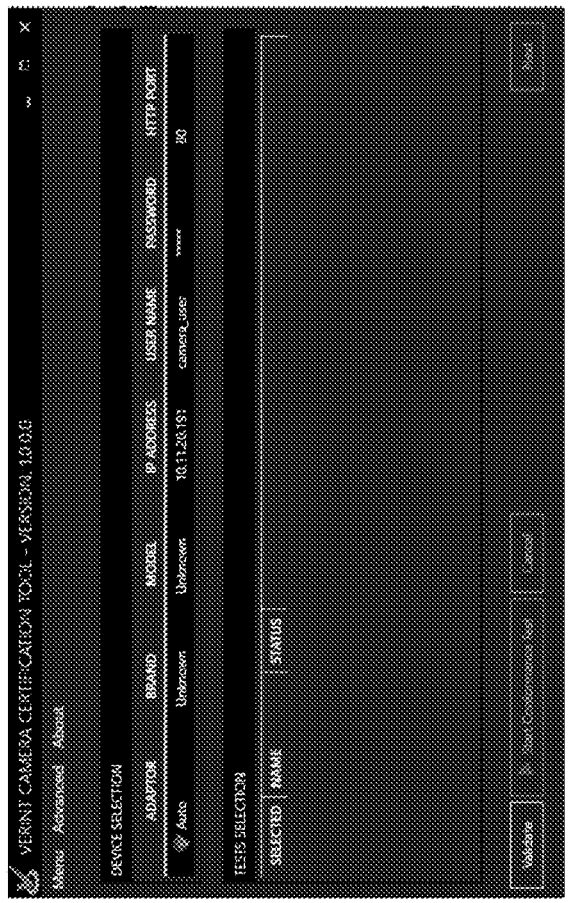
Figure 3B:
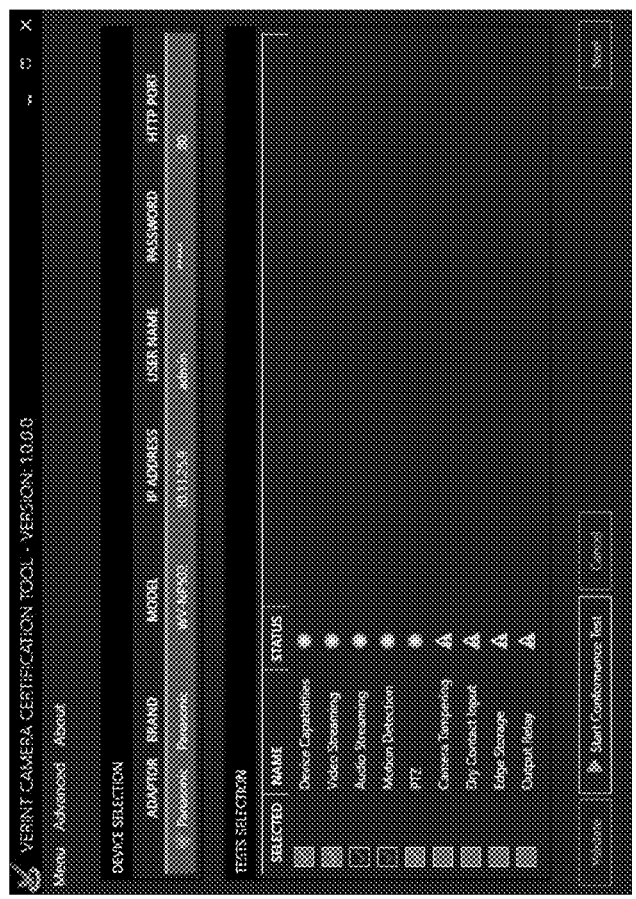
Figure 3C:
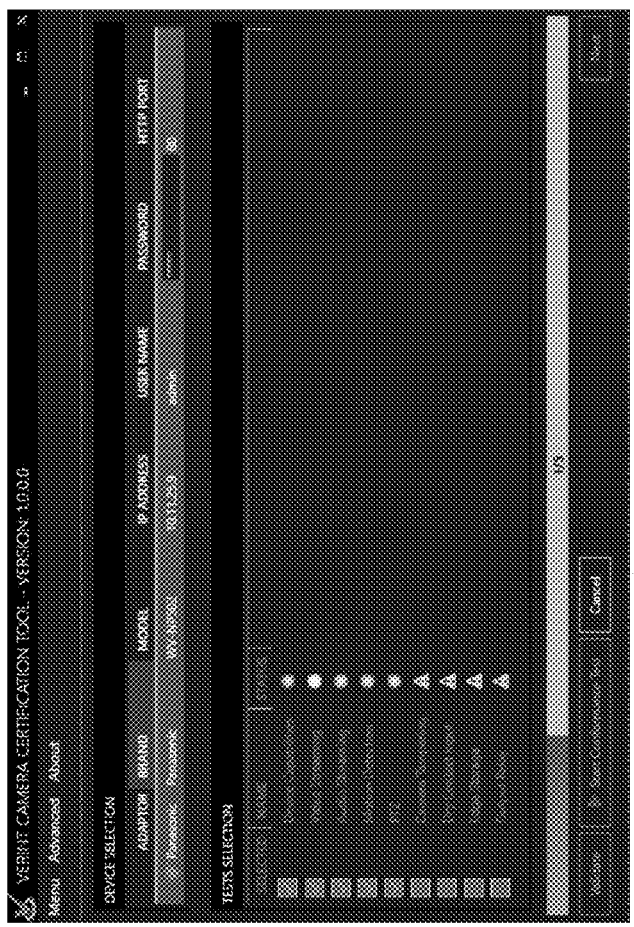
Figure 3D:
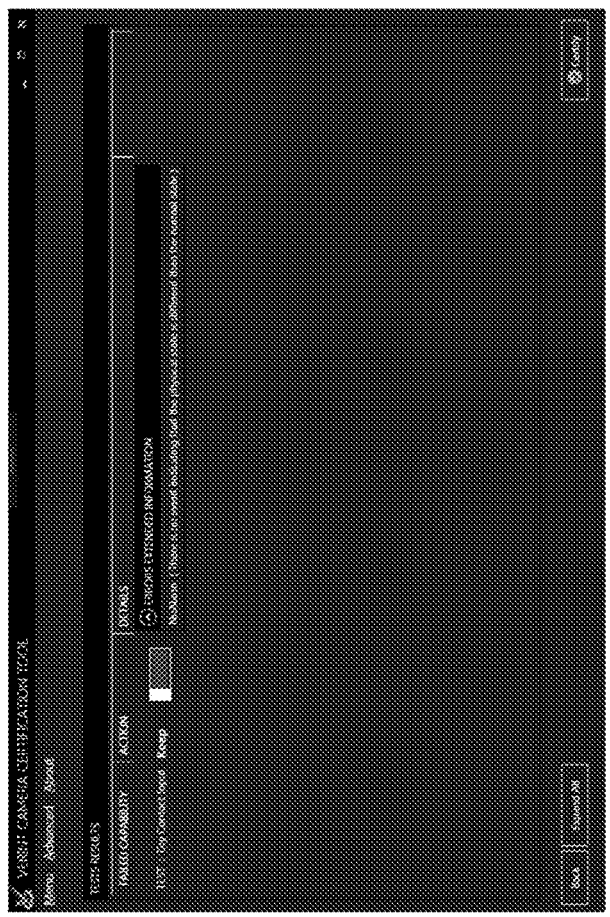
Figure 3E:
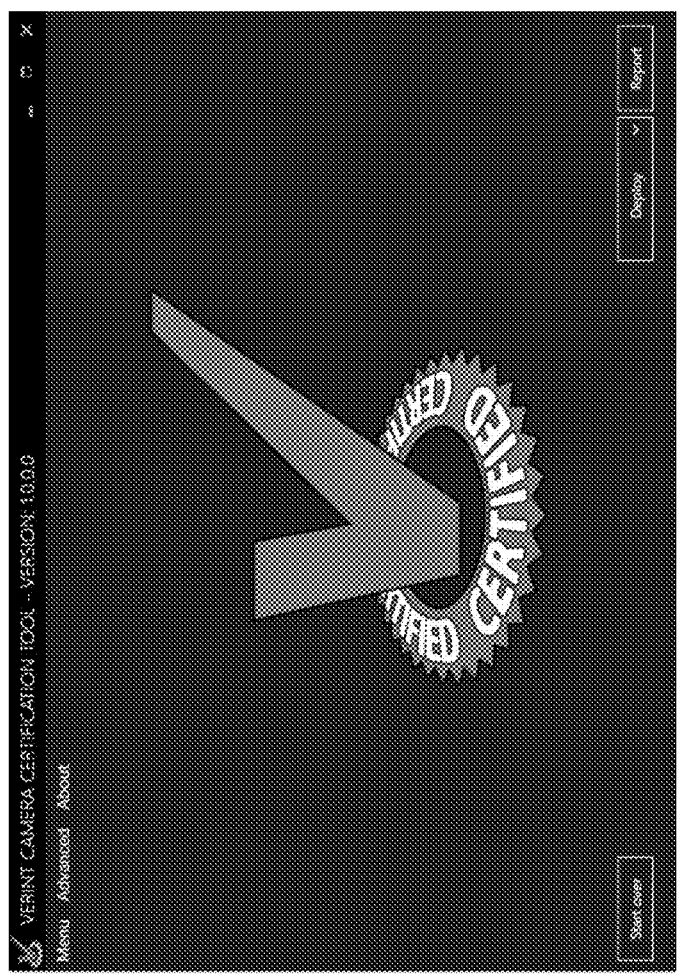

FIGS. 3A-3E are screenshots of an exemplary GUI for a certification application according to an implementation of the disclosure. FIG. 3A depicts a GUI screenshot illustrating the means for entering a user's credentials and camera IP address. FIG. 3B depicts a GUI screenshot illustrating the camera capabilities obtained and the capabilities selected for validation. FIG. 3C depicts a GUI screenshot illustrating the progress of the tests for validation. FIG. 3D depicts a GUI screenshot illustrating the results of the tests for validation. In this case, only the test that failed validation is shown. An option is presented to the user to keep or discard this capability from certification. FIG. 3E depicts a GUI screenshot illustrating the completion of the certification wherein options are provided for the use to export the file created and/or the report of the tests. The generated file, once deployed on a VMS, will allow the camera to function in the video surveillance network and support all functionalities that were certified.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A method for certifying cameras for use by a video management system (VMS) of a video surveillance system, the method comprising:
providing a camera for certification;
obtaining one or more capabilities of the camera;
validating the one or more capabilities of the camera;
receiving results from the validation, wherein the results comprises a pass or a fail for each of the one or more capabilities of the camera;
selecting, from one or more capabilities that received a pass, capabilities for use with the VMS;
creating, based on the selected capabilities, a file for use by the VMS to operate the camera according to the selected capabilities, wherein based on the file, the camera is certified for use by the VMS;
providing a computer that is communicatively coupled to the camera via a network;
performing the obtaining, the validating, the receiving, the selecting, and the creating using the computer; and
displaying, via a graphical user interface (GUI) on a display of the computer, information corresponding to the obtaining, the validating, the receiving, the selecting, and the creating;
wherein the validating comprises:
selecting, using the GUI, one or more of the capabilities of the camera for testing;
wherein each test comprises:
performing a test for each of the one or more selected capabilities in sequence;
transmitting a message to the camera from the computer to perform an operation according to one of the selected capabilities;
receiving information at the computer from the camera, wherein the information comprises information from the camera resulting from the performed operation;
comparing the received information to an expected test result; and
determining a pass or a fail for the test based on the comparison.

2. The method according to claim 1, wherein the camera is an IP camera.

3. The method according to claim 1, the operation is one or more of device capability reporting, video streaming, audio streaming, motion detecting, output relay, dry contact input pan-tilt-zoom moving, camera tampering, and edge storage.

4. The method according to claim 1, wherein the file is an extensible markup language (XML) file.

5. The method according to claim 4, further comprising:
using the certified camera with the VMS of the video surveillance system according to the XML file.

6. A non-transitory system for certifying cameras for use by a video management system (VMS) of a video surveillance system, the system comprising:
a camera; and
a computer that is communicatively coupled to the camera via a network, wherein the computer includes a processor that is operated by software to:
obtain one or more capabilities of the camera for certification,
validate the one or more capabilities of the camera,
receive results from the validation, wherein the results comprises a pass or a fail for each of the one or more capabilities of the camera,
select, from one or more capabilities that received a pass, capabilities for use with the VMS, and
create, based on the selected capabilities, a file for use by the VMS to operate the camera according to the selected capabilities, wherein based on the file, the camera is certified for use by the VMS;
display, via a graphical user interface (GUI) on a display of the computer, information corresponding to the obtaining, the validating, the receiving, the selecting, and the creating;
wherein to validate, the processor is operated by software to:
receive a selection, from the GUI, of one or more of the capabilities of the camera for testing;
perform a test for each of the one or more selected capabilities in a sequence;
wherein for each test, the processor is operated by software to:
transmit a message to the camera to perform an operation according to one of the selected capabilities;
receive information from the camera, wherein the information comprises information from the camera resulting from the performed operation;
compare the received information to an expected test result; and
determine a pass or a fail for the test based on the comparison.

7. The system according to claim 6, wherein the camera is an IP camera.

8. The system according to claim 6, wherein the processor is operated by software to obtain, validate, receive, select, and create within a period of less than 30 minutes.

9. The system according to claim 6, the operation is one or more of device capability reporting, video streaming, audio streaming, motion detecting, output relay, dry contact input pan-tilt-zoom moving, camera tampering, and edge storage.

10. The system according to claim 6, wherein the file is an extensible markup language (XML) file.

11. The system according to claim 10, further comprising:
 a VMS running on a computer that operates the camera in a surveillance system according to the XML file.

12. A computer readable medium containing computer readable instructions that when executed by a processor of a computing device cause the computing device to perform a method comprising:
 providing a camera for certification;
 obtaining one or more capabilities of the camera;
 validating the one or more capabilities of the camera;
 receiving results from the validation, wherein the results comprises a pass or a fail for each of the one or more capabilities of the camera;
 selecting, from one or more capabilities that received a pass, capabilities for use with the VMS;
 creating, based on the selected capabilities, a file for use by the VMS to operate the camera according to the selected capabilities, wherein based on the file, the camera is certified for use by the VMS;
 providing a computer that is communicatively coupled to the camera via a network; and
 performing the obtaining, the validating, the receiving, the selecting, and the creating using the computer; and
 displaying, via a graphical user interface (GUI) on a display of the computer, information corresponding to the obtaining, the validating, the receiving, the selecting, and the creating;
 wherein the validating comprises:
  selecting, using the GUI, one or more of the capabilities of the camera for testing;
  performing a test for each of the one or more selected capabilities in sequence;
  transmitting a message to the camera from the computer to perform an operation according to one of the selected capabilities;
  receiving information at the computer from the camera, wherein the information comprises information from the camera resulting from the performed operation;
  comparing the received information to an expected test result; and
 determining a pass or a fail for the test based on the comparison.

13. The computer readable medium according to claim 12, wherein the camera is an IP camera.

14. The computer readable medium according to claim 12, wherein the operation is one or more of device capability reporting, video streaming, audio streaming, motion detecting, output relay, dry contact input pan-tilt-zoom moving, camera tampering, and edge storage.

15. The computer readable medium according to claim 12, wherein the file is an extensible markup language (XML) file.

16. The computer readable medium according to claim 15, the method further comprising:
 using the certified camera with the VMS of the video surveillance system according to the XML file.

* * * * *